United States Patent [19]

Sheinbaum

[11] 4,079,590
[45] Mar. 21, 1978

[54] WELL STIMULATION AND SYSTEMS FOR RECOVERING GEOTHERMAL HEAT

[76] Inventor: Itzhak Sheinbaum, 2038 E. Altadena Dr., Altadena, Calif. 91001

[21] Appl. No.: 565,389

[22] Filed: Apr. 7, 1975

[51] Int. Cl.$^2$ .............................................. F03G 7/00
[52] U.S. Cl. ........................................ 60/641; 165/45; 166/267; 166/268; 166/272
[58] Field of Search ............... 166/268, 269, 265, 266, 166/267, 272, 302, 306; 165/45; 60/641

[56] References Cited

U.S. PATENT DOCUMENTS

| | | | |
|---|---|---|---|
| 3,580,330 | 5/1971 | Maugis | 165/45 |
| 3,640,336 | 2/1972 | Dixon | 165/45 |
| 3,817,038 | 6/1974 | Paull et al. | 60/641 |
| 3,827,243 | 8/1974 | Paull et al. | 166/272 |
| 3,864,917 | 2/1975 | Jacoby | 60/641 |

*Primary Examiner*—Allen M. Ostrager
*Attorney, Agent, or Firm*—Warren T. Jessup

[57] ABSTRACT

The flow from geothermal wells is stimulated by injecting a liquid at selected levels in the well with the liquid having a boiling point below the temperature of the geothermal fluid at the levels of injection at the operating pressure at the levels of injection. The geothermal fluid and vaporized injected fluid from the well are applied to a system for extracting the heat energy as well as for cleaning sand and other well depositions that may accumulate in the geothermal well. The system may include a direct contact heat exchanger having either a vertical chamber or a horizontal chamber. The contactor has a plurality of zones including a boiler zone, one or more separation zones, and at least one heat exchange zone. The contactor may also include a wash zone and a flash zone.

In the wash zone there is advantageously included re-circulation trays vertically spaced for washing the vapor to remove entrained substances, such as minerals dissolved in the fluid from the geothermal wells. The recirculation trays include a manway for ease of access and service. The vaporized fluids from the contactor are passed through a power extracting gas expansion device, with the composition of the vapor being controlled to maximize the power extractable by the gas expansion device.

31 Claims, 10 Drawing Figures

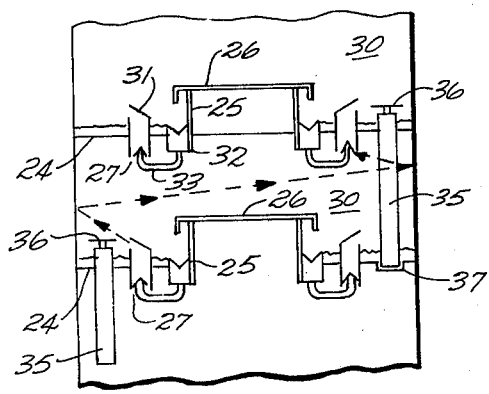
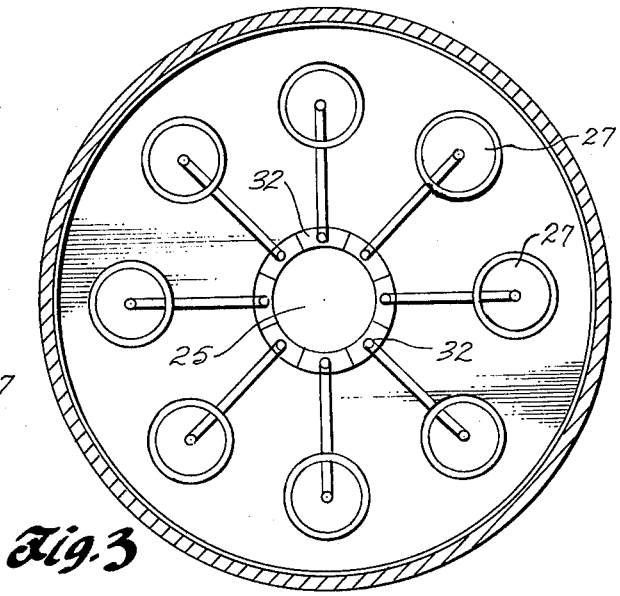
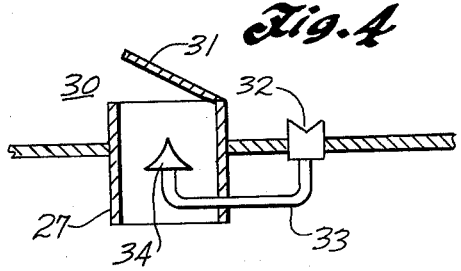
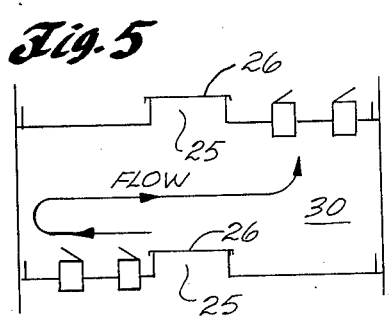
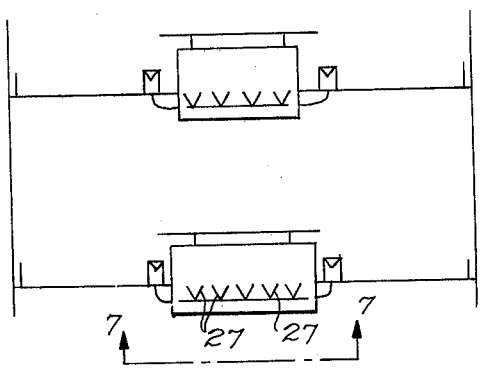
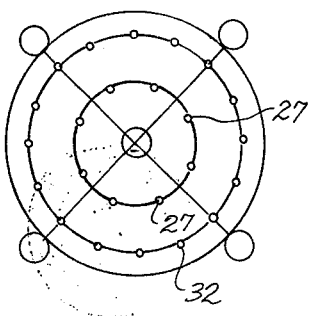

WELL STIMULATION AND SYSTEMS FOR RECOVERING GEOTHERMAL HEAT

BACKGROUND OF THE INVENTION

1. Field of the Invention

This invention relates to extraction of geothermal heat energy from the earth and more particularly to the stimulation of flow from geothermal wells and systems for recovering the heat carried by a carrier fluid, such as water, from geothermal wells.

It is known that the interior of the earth is a molten mass of rocks and is very hot. This geothermal heat energy may advantageously and efficiently be employed as a primary source of energy for the generation of power through fluid as a carrier. The fluid may be steam released from volcanic areas or hot water which is present in volcanic and in deep alluvial deposits that are porous enough to permit percolation of water to the deep hot zones. This water may have a temperature as high as 700° F. at a depth of 5,000 feet.

Additionally, the carrier fluid may be injected into the earth by means of a well where the carrier fluid is vaporized upon contact with the heat energy in the earth. This heat energy may be present in dry rock beds or in fluids, such as water, in the well.

2. Description of the Prior Art

In some areas the heat energy within the earth is carried to the surface by steam. This steam may be used directly in turbines to drive the generator to generate electricity as the means of efficiently and effectively recovering the heat energy. Where there is a mixture of steam, noncondensibles, such as carbon dioxide, and hot water, the steam and noncondensibles may be separated in a flash chamber and then used in a steam turbine. The fluid from a geothermal well may flow naturally to the surface or may have to be pumped to the surface. Where pumping is required, it is typically accomplished by locating the pump at a selected level below the surface of the earth. When the pump is located in the well, a long drive shaft is generally required between the pump and the drive motor. These pumps and motors are relatively expensive and often require servicing which is also relatively expensive.

Other geothermal well pumping devices have been proposed, including an electrically driven pump where the motor and the pump are submersed in the well. This proposal has not been reduced to practice, and the relative cost and efficiency has not been determined. Many self-flowing water dominated wells do not spontaneously flow without some startup boosting. In the past, well start-up stimulation was accomplished mainly by one of the following three methods:

a. By pumping fresh water down the well;
b. By inserting a tube down the well and pumping air or inert gases down the tube;
c. By inserting a tube down the well and pumping liquefied gases, such as liquid nitrogen or carbon dioxide, down the tube.

In each case, the principle of the well stimulation is the same, namely, a reduction in the density of the well fluid present in the well casing to cause disequilibrium in the well hydraulic system, and thus, commence the flow. Once started, the self-flowing well will continue to flow without any additional stimulation.

SUMMARY OF THE INVENTION

To overcome the disadvantage of deep pumps and to otherwise increase the ability to remove heat energy from the earth, a fluid is injected into the well in accordance with this invention to contact the heat energy within the earth and to act as a carrier of that heat to a system above the surface. The injection fluid has a boiling point below the temperature of the geothermal fluid at the level of injection at the operating pressure existing at the level of the injection and is other than a noncondensible gas.

In a well containing a hot fluid, such as water, that has been heated by the heat within the earth, the injected fluid in accordance with this invention acts as a primer to stimulate the flow of the hot fluid from the well. The primer fluid or injected fluid is vaporized, the vapors thus formed mix with the hot fluid in the well and reduce the density of the column of well fluid in the well casing, which causes a pressure differential that forces this fluid from the well. The action of well stimulation as described herein may also be used to clean well deposits such as sand and other solids from the well. The flowed mixture of vaporized primer fluid and hot geothermal fluid, which may be both vapor and liquid, is used as a heat transfer fluid that is passed in heat exchange relationship with a working fluid that is vaporized and passed through a power extracting gas expansion device. The transfer of heat advantageously takes place in a direct contact heat exchanger where the mixture directly contacts a working fluid. The direct contact heat exchanger consists of a vertical chamber having a first inlet near the top for the mixture and a second inlet near the bottom for the working fluid. The heat exchanger also has an outlet at the top for the resultant working fluid vapor and an outlet at the bottom for the cooled geothermal fluid. The primer fluid and working fluid may advantageously be the same substance and the direct contact heat exchanger may then have an additional outlet above the level of the liquid geothermal fluid in the heat exchanger and below the liquid level of the working fluid for extracting working fluid to be injected into the geothermal well. Advantageously, this primer fluid is at a temperature near the temperature of the fluid in the geothermal well at the level of injection. The heat exchanger, as a vertical chamber, advantageously has a flash zone above the boiling zone, the separation zone and the heat exchange zone. In the flash zone, the steam in the geothermal fluid may be recovered for use in driving a power extracting gas expansion device in conjunction with the vapor of the working fluid.

Further, in the heat exchanger, a wash zone may be provided near the top of the vertical chamber for removal of entrained substances, such as minerals that may have dissolved in the geothermal fluid. The wash chamber contains recirculation trays with manways therein for service and inspection purposes.

The vaporized working fluid carries with it saturated steam from the direct contactor and into the gas expansion device. The gas expansion can advantageously be accomplished in a single or in multiple stages of a radial inflow type expander or other gas expansion devices that are relatively insensitive to mist formation in the exhausted expander gases. The power fluid is defined as the total mixture of vaporized substances to be expanded through the gas expansion device. The power fluid may contain the working fluid and an added substance as steam or other vaporized compound that can advantageously condense upon expansion and increase the efficiency of the Rankine cycle.

The direct contact heat exchanger may consist of a horizontal chamber in place of a vertical chamber. The horizontal contactor is divided into a number of sections by vertical dividers which may be solid or porous. The contactor includes a boiler section, a plurality of heat exchange sections, and a separation section. The hot fluid is injected near one end in the boiler section while the working fluid is injected near the opposite end in a separation section. The vaporized working fluid is removed from the boiler section to be applied to a utilization means. The cooled hot fluid is removed from the opposite end beyond the injection of the working fluid. The working fluid from one section is pumped to the next higher temperature section where it is mixed with hot fluid from the next higher temperature section. The mixing takes place in a mix chamber or jet outside or inside the contactor.

Where the well does not contain a fluid, heat may be recovered from hot dry rock accessible through a well.

In accordance with this invention, an injection fluid other than water is used to recover the heat from dry rock formation. This is especially useful in the recovery of heat from hot rock where the formation temperature is not suitable for water vaporization or where the deposition of minerals in the rock crevices is undesirable.

BRIEF DESCRIPTION OF THE DRAWINGS

The above and other features and advantages of this invention may be understood more clearly and fully upon consideration of the following specification and drawings in which:

FIG. 2 is an enlarged elevational view of a portion of the contactor of FIG. 1 depicting recirculation trays in the wash zone of the direct contact heat exchanger shown in FIG. 1;

FIG. 3 is a bottom plan view of the recirculation trays of FIG. 2;

FIG. 4 is an enlarged view of a representative vaporizing nozzle in the recirculation trays of FIGS. 2 and 3;

FIG. 5 is a diagram of the flow path of the vapor between the recirculation trays;

FIG. 6 is an enlarged view of an alternative embodiment of the recirculation trays;

FIG. 7 is a bottom plan view of the central portion of the recirculation trays of FIG. 6;

DESCRIPTION OF THE PREFERRED EMBODIMENTS

Heat from the earth may be carried above the surface by a hot fluid such as water from a geothermal well. Water may be relatively pure as found in the Mammoth areas of California or relatively briny as found in the Imperial Valley of California. In either case the extraction of this water carrying heat from below the earth's surface is advantageous as the hot fluid may be used for many purposes. One particular use is the heating and vaporization of a working fluid with the vaporized working fluid being expanded in a power extracting gas expansion device for the recovery of the heat energy. The expansion device may advantageously drive a generator for the generation of electricity. It has been found that in many areas the natural flow from geothermal wells is insufficient to warrant the installation of equipment to recover the heat energy contained therein. These wells may be caused to have increased flow in accordance with this invention by injecting a primer fluid at selected levels into the well. A simplified example of the well stimulation principle and calculated pressures in presented.

Figure 1:
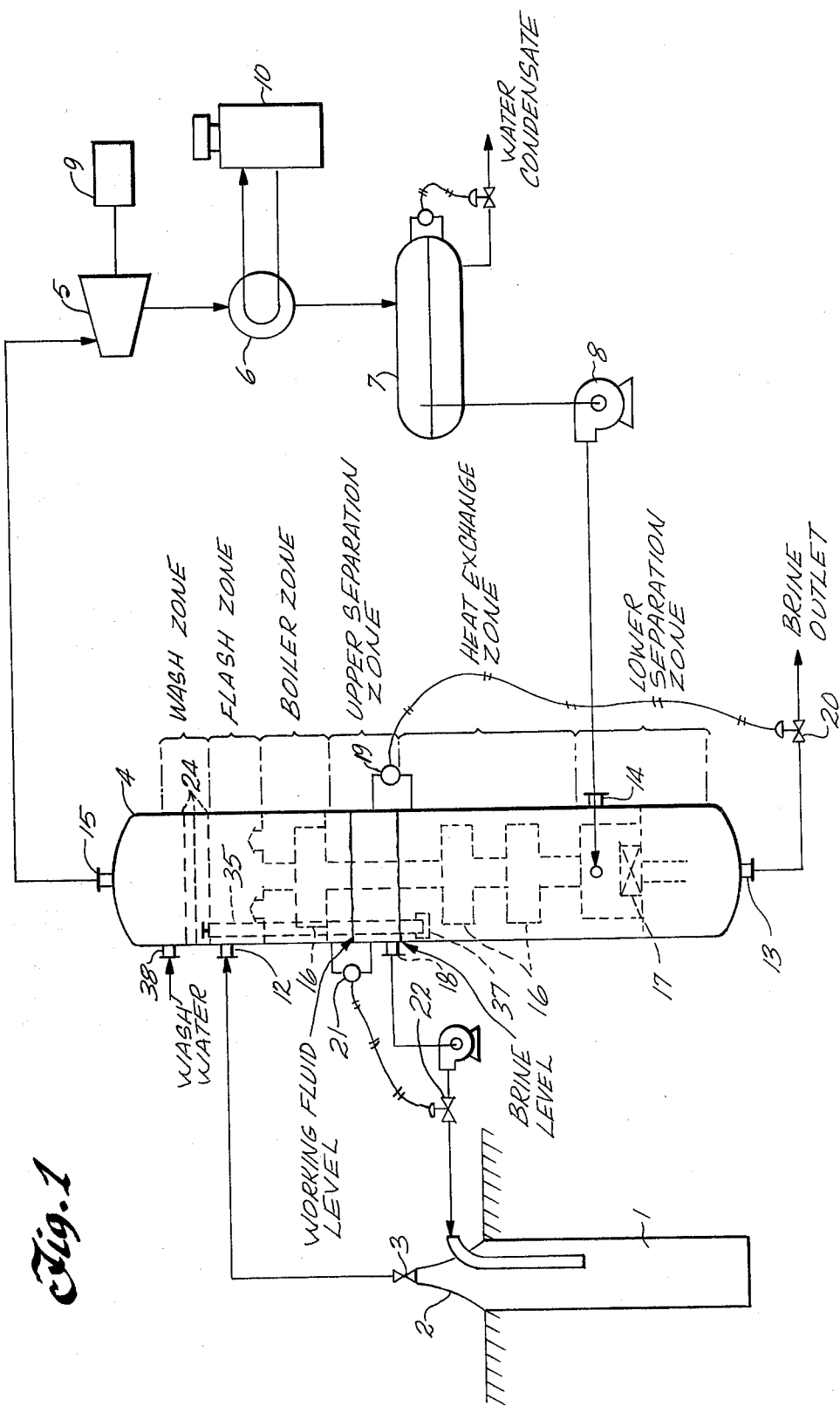
FIG. 1 is a process flow diagram depicting a system in accordance with this invention with the heat exchanger and a well in elevation and in somewhat diagrammatic form.

A geothermal well 1 is diagrammatically shown in FIG. 1 of the drawing for the purposes of illustration. It will be assumed that the well has a depth of 5,000 feet and the water level under static (no flow) conditions stands at 100 feet below the surface when the well is kept at 120 psig casing pressure at the surface. The well 1 is capped with a cover 2 and has a valved outlet 3 for the flow from the well.

It is further assumed that the well is located in an area where salts and other minerals are dissolved in the water and that the geothermal fluid has an average density of 64.4 pounds per cubic foot at the operating temperature. Thus, there is a static pressure at the bottom of the well of approximately 2,311 psig. The bottom hole temperature of geothermal wells can be in excess of 700° F. For the purposes of this disclosure, it is assumed that the bottom hole temperature is 350° F. This is a typical temperature for geothermal wells in California, which typically has the above bottom hole pressure. The well, under atmospheric pressure and after start of stimulation is found to flow at the rate of 50 gallons per minute (GPM). The difference in the bottom hole pressure for the 50 GPM flow is 75 psi. The static pressure outside the casing at the bottom of the well is 2,311 psig, while the bottom hole pressure with the top open is 2,236 psig. A driving force from the production zone to the bottom hole of 75 psi produces a flow of 50 GPM. If the flow is to be increased eight times to 400 GMP, the pressure difference between the production zone and the bottom hole must also be increased by approximately eight times. Under these conditions the pressure difference would be 600 psig so that the bottom hole pressure must be 1,711 psig.

To reduce the bottom hole pressure to the desired pressure of 1,711 psig, it has been found that a fluid having a boiling point below the temperature at the level of injection at the operating pressure existing at that level may be injected at an appropriate level to cause a reduction in the static pressure. For example, if an injected fluid or primer fluid such as isopentane is injected at a depth of 2,000 feet and a temperature of 200° F, when the injected fluid is vaporized and well mixed with the well fluid, the average density of the fluid is reduced to 18.0 lb/CF in the top 2,000 feet of the casing. The bottom hole pressure is reduced to approximately 1,711 psig, and about 400 GPM of geothermal fluid will flow from the well. Under the illustrative conditions about 84 GPM of isopentane at 200° F is injected at the 2,000 foot level to cause the 400 GPM of geothermal fluid to flow from the well. The primer fluid upon contacting the geothermal fluid at the pumping depth or injection level is vaporized and is combined with the hot geothermal fluid in flowing from the well. The above example is simplified and presented herein for illustrating the principle of the flow stimulation only.

Other hydrocarbons and its derivitives, such as isobutane, and any of the freons, may be used as the primer fluid.

These primer fluids have a much lower heat of vaporization than does water and consequently there is little degradation in the temperature of the geothermal fluid as it comes up the well after well stimulation in accordance with this invention. In a self-flowing well that is stimulated by vaporization of a portion of the water in the well there is a greater degradation in temperature than when using one of the primer fluids set forth herein. For example, the hydrocarbons have a heat of vaporization between 100 and 200 Btu's while water has a heat of vaporization of approximately 1000 Btu's. As a consequence, more heat is lost in vaporizing the water than in vaporizing primer fluids in accordance with this invention.

The primer fluid or injector fluid may be injected at numerous different levels in the well or it may be injected at a single level. Additionally, the primer fluid may be injected continuously or intermittently for surge flow.

The hot geothermal fluid and vaporized primer fluid may be used for many purposes. The mixture may be used for heating buildings such as is done in Iceland. Another particularly advantageous use is the generation of electricity by driving one or more generators from one or more power extracting gas expansion devices (expanders). The vapors of the geothermal fluid and the primer fluid may be separated from the mixture in a flash chamber and used directly in an expander. Alternatively, the vapors may be employed in one or more heat exchangers to heat a heat transfer fluid or a working fluid, the vapors of which are passed through an expander.

One particularly efficient use of the mixture is shown in the system depicted by the process flow diagram of FIG. 1. The system includes a closed loop in which a working fluid is circulated. The closed loop includes a direct contact heat exchanger (contactor) 4, a power extracting gas expansion device (expander) 5, a condenser 6, a separator 7, and a pump 8. The expander 5 drives a utilization means 9 which may advantageously be an electrical generator for the generation of electricity. The condenser 6 is cooled by a fluid which may advantageously be supplied from a cooling tower 10 operating at atmospheric conditions.

The contactor 4 consists of a vertical chamber divided into a plurality of sections or zones. The chamber includes at least a boiler zone, a heat exchange zone and a separation zone. The hot geothermal fluid is admitted near the top of the chamber and is removed after being cooled from the bottom of the chamber. The working fluid is admitted near the bottom of the chamber and flows up through the hot geothermal fluid and the vapors are expelled from the top of the chamber. The working fluid has a specific gravity below the specific gravity of the geothermal fluid and will thus rise in the chamber. Advantageously, the working fluid is identical to the primer fluid and for purposes of illustration, it is assumed that the working fluid is isopentane. Any of the other hydrocarbons, its derivatives, and also the freons may advantageously be employed as the working fluid.

As diagrammatically shown in FIG. 1, the contactor 4 has a number of flow diversion elements 16 in the heat exchange zone for improving the heat exchange between the geothermal fluid and the working fluid. The trays 16 may also advantageously be employed in the boiler zone to improve the heat exchange in this zone. A coalescer 17 is located near the bottom of the contactor 4 to enhance the operation and settling of the geothermal fluid at the bottom of the contactor 4. The contactor 4 further includes an upper separation zone in which a geothermal fluid level, or brine level, is maintained and which supports the working fluid. The contactor 4 includes an outlet 18 in the upper separation zone for removing the desired quantity of primer fluid for injection into the geothermal well for stimulating the flow of the fluid from the well. The brine level is maintained by a level controller 19 controlling a valve 20 in the output line for the brine at the bottom of the contactor 4. The level of the working fluid in the contactor 4 is controlled by a level control device 21 controlling a valve 22 in the output line from outlet 18 for the primer fluid.

The vapors in the mixture from the geothermal well may advantageously be separated and employed, such as in expander 5, by including a flash zone in the contactor 4. However, because of minerals that may be dissolved in the geothermal fluid and which may be carried over with the vapors, the contactor 4 further advantageously includes a wash zone. In the wash zone, recirculation trays 24 are employed for the removal of any entrained minerals or other undesirable solid substances.

The recirculation trays 24 are shown in greater detail in FIGS. 2 through 7 of the drawings. Two of the trays 24 are shown in elevation in FIG. 2. The trays 24 advantageously include a centrally located opening 25 which provides a manway or access for inspection or service of the trays 24. The manways 25 are covered by covers 26 to prevent the flow of vapors through the manways when in operation. The recirculation tray 24 further includes a plurality of vapor riser passages 27. A liquid is maintained on each tray for use in the removal of the entrained minerals from the vapors. A predetermined portion of the tray liquid is metered and delivered into a vapor neck or riser 27 where the vapor velocity entrains the liquid and carries it into a separation space 30 above the tray 24, a recirculation effect occurring by reason of the return to the tray liquid of liquid particles collecting in the vapor space. Each vapor riser passage 27 is capped by a deflector 31 for selectively directing the flow of the vapor at the output of each riser passage. The tray liquid flows into one of the distribution cups 32 formed around the manway 25. Each distribution cup 32 is V-notched to provide for structural metering or a weir arrangement for the tray liquid. The liquid in each distribution cup 32 flows by gravity flow or is pumped through a tube 33 into the center of a cooperating vapor riser passage 27. The end of the tube 33 may open directly into the passage 27 or may terminate in an atomizing nozzle 34. In either event, the upward passage of the vapor through the vapor riser 27 will draw the liquid from the tube 33 and will carry it into the vapor space above the tray for removal of any minerals entrained in the vapor. With the covers 31 positioned as shown in FIGS. 2 and 4, the vapor flow path will be as shown in FIG. 5.

The recirculation trays may alternatively be contructed as shown in FIGS. 6 and 7. In the trays of FIGS. 6 and 7, the vapor riser passages 27 are positioned in the central portion of the tray with the tray liquid metering and distribution system being located around the vapor riser passages 27.

There is an overflow pipe 35 (shown in FIG. 2) associated with each recirculation tray 24 to control the level of the liquid on each tray. Each overflow pipe 35 carries a baffle 36 and projects above the tray proper a distance that predetermines the liquid level on the tray. The lower end of each overflow pipe 35 extends downwardly into a liquid seal cup 37 in the next lower tray 24. The lowermost overflow pipe 35 terminates in a seal cup 37 within the bottom liquid chamber of the contactor 4 as shown in FIG. 1.

The tray liquid may advantageously be water supplied through an opening 38 in the contactor 4. The supply of water is controlled to wash the solids removed by the recirculation trays down through the downspouts 35.

In operation the mixture of vaporized primer fluid and geothermal fluid enters the flash zone of the contactor 4 at a temperature such as 210° F. The hot geothermal liquid flows from the top of the contactor 4 to the bottom in contact with the working fluid which is passing from the bottom to the top. The vaporized working fluid and any vapors from the geothermal fluid pass from the contactor 4 and are expanded in the expander 5 for the extraction of useful energy. The pressure and temperature of the working fluid is reduced at the output of the expander 5 and the fluid is completely condensed in the condenser 6. Some of the fluid may be advantageously condensed in the outlet of expander 5, or the working fluid may exit expander 5 superheated for better cycle efficiency under some circumstances.

It is a feature of this invention to condense some of the working fluid and/or the steam it carries by expanding the gases in the expander to its two-phase region. Under these conditions the working fluid is selected to maximize the benefits of this expansion into the two-phase region. The vaporized working fluid carries with it saturated steam from the direct contactor and into the gas expansion device. The gas expansion can advantageously be accomplished in single or multiple stages of a radial inflow type expander or other gas expansion devices that are relatively insensitive to mist formation in the exhausted expander gases. The expansion of the power fluid in the Rankine cycle into the two-phase zone (where vapor and liquid coexist) can substantially increase the total power produced upon expansion of the power fluid and at the same time reduce the heat that needs to be rejected by the power fluid upon condensation. The power fluid is defined as the total mixture of vaporized substances to be expanded through the gas expansion device. The power fluid may contain the working fluid and an added substance such as steam or other vaporized compound that can advantageously condense upon expansion and increase the efficiency of the Rankine cycle.

The expansion in the two-phase region is accomplished by using a working fluid such as isopentane as a carrier for a heavier fluid such as steam that can partially or totally condense at the pressure and temperature that the working fluid experiences at the outlet of the expander 5. The working fluid may also be selected to partially or totally condense at the expander's outlet condition.

Any fluid at the outlet of expander 5 that has not been condensed is condensed in the condenser 6. The liquid output of the condenser 6 is applied to a separator 7 wherein the working fluid is separated from the water, with the working fluid being recirculated through the pump 8 to the contactor 4. The water condensate is extracted from the separator 7 and may be partially used as the wash water inserted at inlet 38 of contactor 4.

Figure 8:
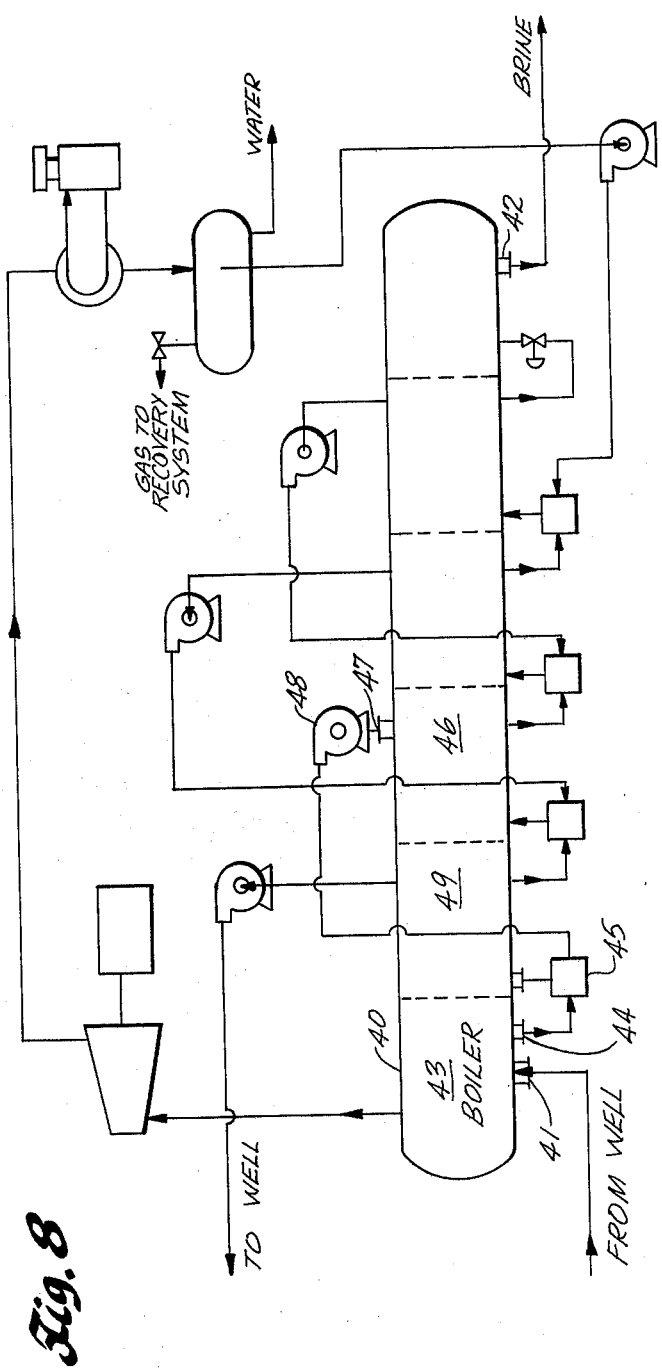
FIG. 8 is a process flow diagram of a system in accordance with this invention employing a horizontal direct contact heat exchanger.

As an alternative to the vertical contactor 4 in the system of FIG. 1, a horizontal heat exchanger may be employed as shown in FIG. 8. The horizontal exchanger 40 is divided into zones similar to the zones of the vertical contactor 4 of the system of FIG. 1. The horizontal exchanger 40 includes a boiler section at the left end where the fluid from the well enters through an inlet 41. The intermediate sections of the exchanger 40 are heat exchange zones which operate at progressively lower temperatures.

The next to the last section is the separation zone where the working fluid is separated from the geothermal fluid for subsequent extraction of the cooled geothermal fluid. The right end section of the exchanger 40 is the section from which the geothermal fluid is extracted through an outlet 42. The geothermal fluid from a higher temperature section is combined with the working fluid from a lower temperature section in mixing chambers or jets 45 associated with each intermediate temperature section for enhancing heat exchange between the fluids. For example, the geothermal fluid in the boiler section 43 passes through an outlet 44 into mixer chamber 45. The working fluid from the lower temperature heat exchange zone 46 is pumped from an outlet 47 by a pump 48 to another input of mixing chamber 45. The mixed geothermal fluid and working fluid are then passed into heat exchange section 49 for further transfer of heat from the geothermal fluid to the working fluid. There are similar mixing chambers associated with the other intermediate heat exchange sections for mixing geothermal fluid from a higher temperature section with the working fluid from a lower temperature section and injection into an intermediate temperature heat exchange section. The balance of the system is identical to the system of FIG. 1 and operates in the same manner.

Figure 9:
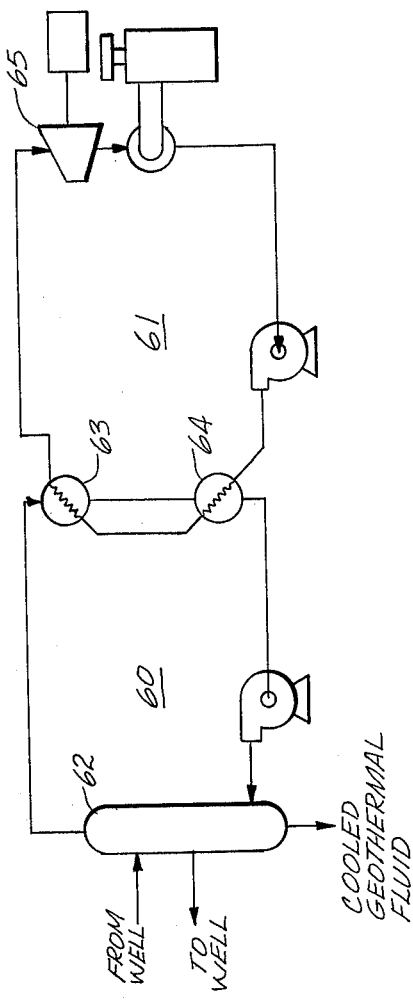
FIG. 9 is a process flow diagram of an alternative system for recovering the heat from geothermal fluid from a well stimulated in accordance with this invention.

An alternative system for extracting the heat energy from the geothermal fluid is depicted by the process flow diagram of FIG. 9. In the system of FIG. 9, a heat transfer fluid is employed between the working fluid and the geothermal fluid for transfer of heat from the geothermal fluid to the working fluid. In the system of FIG. 9 there is a first closed loop 60 in which the heat transfer fluid circulates and a second closed loop 61 in which the working fluid circulates. The geothermal fluid from the well which may have stimulated flow in accordance with the invention herein is applied to a direct contact heat exchanger 62 in the manner described in connection with the system of FIG. 1. The heat transfer fluid does not have to be vaporized in the system of FIG. 9 but need only carry the heat from the geothermal fluid to the working fluid through the heat exchangers 63 and 64. The working fluid will be vaporized in the heat exchangers 63 and 64 and useful power will be extracted by an expander 65. The balance of the heat transfer fluid is pumped into the well for flow stimulation.

Figure 10:
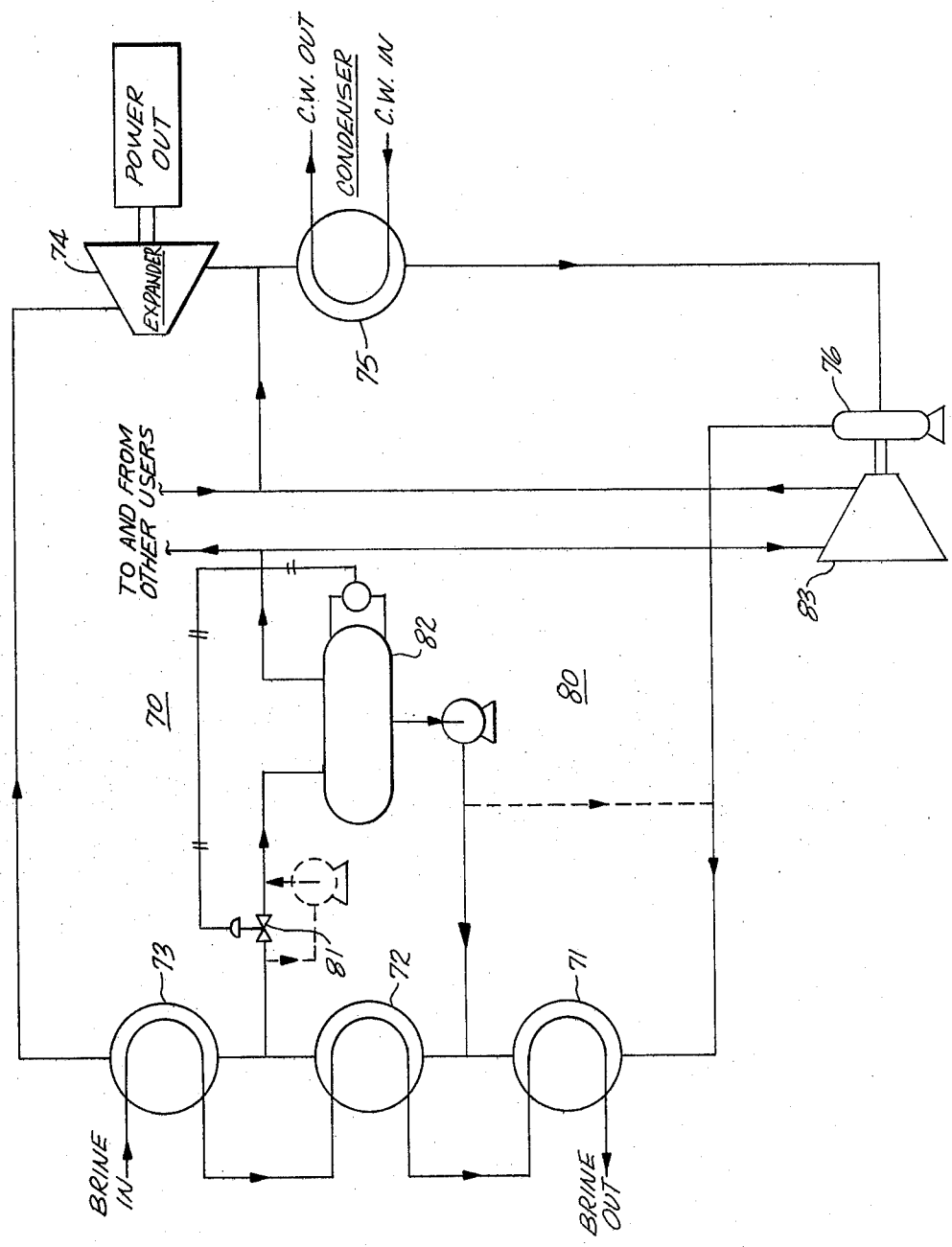
FIG. 10 is a process flow diagram of an alternative system providing improved efficiencies where the geothermal fluid heats a working fluid in either direct or indirect heat exchangers.

A system having improved efficiency is depicted by the process flow diagram of FIG. 10. This system employs geothermal fluid pumped from a well which may be stimulated in accordance with the above. In any event the geothermal fluid is applied to a plurality of heat exchangers which are either direct or indirect exchangers for vaporizing a working fluid circulating in a closed loop. The closed loop 70 includes heat exchangers 71, 72 and 73, expander 74, condenser 75, and pump 76. A portion of the working fluid flows in a second closed loop 80 for improving the efficiency of the system. A portion of the working fluid is removed at the output of heat exchanger 72 and passes through a control valve 81 into a drum 82. The pressure and temperature of this working fluid in the drum 82 are reduced at constant enthalpy so that the working fluid is vaporized. The vapor formed in the drum 82 is applied to an expander 83 and is thereafter condensed in condenser 75 along with the working fluid at the output of the main expander 74. The secondary expander 83 may advantageously drive the main pump 76 for the system. By this system more working fluid may be circulated and more heat extracted from the geothermal fluid. Additionally, by the circulation of more working fluid, one-pass shell and one-pass tube heat exchangers may advantageously be employed in the system.

For wells that do not contain a fluid and that provide an access to hot dry rock, an injection fluid other than water is used, in accordance with this invention, to recover the heat from the hot dry rock formation. This is especially useful in the recovery of heat from hot rock where the formation temperature is not suitable for water vaporization or where the deposition of minerals in the rock crevices is undesirable.

Some geothermal heat deposits are known to exist in hot dry rocks. It was proposed that the heat from these deposits be recovered by injecting water into the hot rocks and use the steam formed upon vaporization of the water to produce power. Such steam is produced naturally in California in the geyser fields and in other locations where the surface water can communicate with the hot rocks and vaporize. However, in most cases the hot rock is buried under layers characterized by low permeability, and significant quantities of surface water cannot penetrate the upper cooler layers of the hot rock.

The hot dry rock is known to be relatively impermeable and tests show little or no loss of injection fluid when the rock is hydraulically tested. It is also known that rock crevices can be formed by hydraulically pressurizing the rock formation with a minimum of hydraulic fluid losses.

When injecting a fluid into the hot dry rock, most of the heat from hot rock is transferred to the fluid in the rock crevices, (because of the large surface area). It is of primary importance to keep these crevices clean for maximum utilization of the heat source. When water is used for the heat transfer media, it may contain dissolved solids, and, in addition, upon heating and prior to vaporization, it will dissolve minerals out of the hot rock. The brine thus formed will penetrate the crevices, vaporize and deposit the minerals in the crevice. In this process the dry hot rock formation will get plugged up by both the minerals dissolved in the injected water and the internal migration of minerals from the hot rock to the crevices. By selecting a suitable injection fluid, such as hydrocarbon for its low solubility tolerance for mineral salts, the above process can be eliminated. In addition, the injection fluid section will be governed by the rock temperature, permeability, and composition.

Various changes may be made in the details of construction without departing from the spirit and scope of this invention as defined by the appended claims.

I claim:

1. A method of recovering heat energy from a geothermal well comprising the steps of:

injecting a fluid into the geothermal well at a selected level, the injected fluid having a lower specific gravity than the geothermal water at the temperature of the geothermal fluid at the level of injection and at the operating pressure in the geothermal well at the level of injection, flowing the mixture from the well, and utilizing the heat energy in the flowed mixture.

2. A process for stimulating the flow of liquid from a geothermal well comprising the steps of:

injecting a fluid, other than a noncondensible gas, into the well at one or more selected levels, under the static water level in the well, the fluid having a lower specific gravity than the geothermal water at the temperature of the water in the well at the point of injection and at the operating pressure at the point of injection.

3. A method in accordance with claim 2 wherein the fluid is continuously injected into the well.

4. A method in accordance with claim 2 wherein the fluid is intermittently injected into the well.

5. A method in accordance with claim 2 wherein the stimulated fluid flowing in the well is used for removing sand and other solids from the well.

6. A method of converting heat energy into mechanical energy comprising the steps of:

injecting a primer fluid other than noncondensible gases into the fluid of a geothermal well at a selected level, the primer fluid having a lower specific gravity than the geothermal water at the temperature of the geothermal fluid at the operating pressure existing at the level of injection, directing a mixture of primer fluid and geothermal fluid flowing from the well into a heat exchanger, passing the mixture in direct contact heat exchange with a working fluid in the exchanger to vaporize the working fluid, and expanding the vaporized working fluid in a power extracting gas expansion device.

7. A method in accordance with claim 6 comprising the further steps of:

condensing the working fluid at the output of the gas expansion device and circulating the working fluid in a closed loop including the heat exchanger, expansion device and condenser.

8. A method in accordance with claim 6 wherein the working fluid has a specific gravity lower than the specific gravity of the mixture.

9. A method in accordance with claim 6 comprising the further step of:

flashing the mixture in a flash zone to separate the vaporized primer fluid and geothermal fluid from the liquid thereof, and combining the vaporized working fluid and vapors of the primer fluid and goethermal fluid before expansion.

10. A method in accordance with claim 9 comprising the further step of:

controlling the composition of the mixture of steam and primer fluid vapors to maximize the power extracted by the gas expansion device.

11. A method in accordance with claim 9 comprising the further step of:

washing the steam, primer fluid vapors and working fluid vapors to remove entrained substances.

12. A method in accordance with claim 11 comprising the further step of dissolving the entrained substances in water supplied to a nozzle located in a restricted path for the vapors.

13. A method in accordance with claim 9 comprising the further step of:
maintaining the mixture at the input to the heat exchanger above a selected temperature and pressure to minimize deposition of minerals that may be dissolved in the geothermal fluid.

14. A method in accordance with claim 6 wherein the primer fluid and working fluid are identical.

15. A method in accordance with claim 14 wherein the working fluid is a hydrocarbon or its derivative.

16. A method in accordance with claim 14 wherein the working fluid is a Freon.

17. A method in accordance with claim 6 wherein the density of the primer fluid is lower than the density of the geothermal fluid.

18. A system for converting geothermal heat energy into mechanical energy comprising means for injecting at selected levels a primer fluid into a geothermal well containing geothermal fluid, the primer fluid having a lower specific gravity than the geothermal water at the temperature of the geothermal fluid at the operating pressure existing at the level of injection, a direct contact heat exchanger, means for directing a mixture of primer fluid and geothermal fluid flowing from the well into the heat exchanger, a working fluid having a boiling point below the temperature of the mixture at the input to the heat exchanger, the working fluid passing through the exchanger in direct contact with the mixture and being vaporized by the heat in the mixture, a power extracting gas expansion device coupled to the vapor output of the heat exchanger, a condenser coupled to the output of the expansion device, and a pump for circulating the working fluid through the heat exchanger, expansion device, and condenser.

19. A system in accordance with claim 18 wherein the direct contact heat exchanger comprises a vertical chamber with an inlet for the mixture near the top, an outlet for the vapors above the mixture inlet, an inlet for the working fluid near the bottom, and an outlet for the cooled geothermal fluid below the working fluid inlet.

20. A system in accordance with claim 19 wherein the chamber further includes an outlet for the primer fluid above the liquid level of the geothermal fluid in the chamber and the system further comprises means for coupling the primer fluid from the primer fluid outlet to the injecting means.

21. A system in accordance with claim 19 wherein the chamber includes a flash zone near the top for separating the vaporized primer fluid and geothermal fluid from the liquid thereof.

22. A method in accordance with claim 2 wherein the injected fluid has a heat of vaporization that is less than the heat of vaporization of water.

23. A method in accordance with claim 2 wherein the injected fluid is non-corrosive.

24. A system in accordance with claim 18 wherein the direct contact heat exchanger is a horizontal heat exchanger comprising:
a boiler section for receiving the geothermal fluid and vaporizing the working fluid,
means for passing the geothermal fluid and a working fluid through one or more successive heat exchange stages, said means including means for mixing the geothermal fluid with a working fluid,
said means for passing the geothermal fluid and working fluid through successive heat exchanging stages includes settling chambers used to extract the heat from the geothermal fluid.

25. A system in accordance with claim 24 wherein each successive stage of the heat exchange process is connected through a mixing chamber, and
means for pumping the working fluid separated from a successive stage to a mixing chamber for mixing with the geothermal fluid of a previous stage.

26. A method of recovering heat energy from a hot geothermal fluid in a horizontal direct contact heat exchanger having a plurality of stages comprising the steps of:
mixing the hot geothermal fluid with a working fluid,
delivering the mixture to a stage of a horizontal direct contact heat exchanger,
allowing said geothermal fluid to settle out of the mixture in the said stage,
delivering said settled geothermal fluid to a mixing chamber of a preceding stage,
collecting said heated working fluid from said first-mentioned stage of the horizontal direct contact heat exchange,
delivering said working fluid to a plurality of successive stages,
vaporizing said working fluid in said successive stages, and
expanding said vaporized working fluid in a gas expansion device for the production of mechanical energy.

27. A method in accordance with claim 26, wherein one or more stage wise-direct contact heat exchanging and settling steps receive a mixture comprised of:
a hot geothermal fluid from a preceding stage, mixed with a preheated working fluid from a subsequent stage.

28. The method in accordance with claim 26 wherein the hot geothermal fluid is progressively cooled and the working fluid is progressively heated in successive countercurrent stages.

29. The method in accordance with claim 26 comprising the additional steps of:
condensing the expanded exhaust vapor,
separating the water out of the working fluid and recycling the working fluid to the horizontal direct contact heat exchanging device.

30. The method in accordance with claim 26 wherein the working fluid is heated in a stage-wise fashion by progressively delivering a working fluid from a subsequent stage through a mixing chamber to a settling chamber of a preceding stage.

31. The method in accordance with claim 26 wherein the working fluid is vaporized in a boiler in one or more stages of the direct contact heat exchanger.

* * * * *